Sept. 24, 1963 R. M. MacINTYRE 3,105,230

COMPENSATING CIRCUITS

Filed Sept. 24, 1958 4 Sheets-Sheet 1

INVENTOR.
ROBERT M. MacINTYRE

BY

Lester S. Hecht

ATTORNEY

INVENTOR.
ROBERT M. MacINTYRE

BY

[signature]
ATTORNEY

INVENTOR.
ROBERT M. MacINTYRE
BY
Lester S. Hecht
ATTORNEY.

COMPENSATING CIRCUITS

Filed Sept. 24, 1958

INVENTOR.
ROBERT M. MacINTYRE
BY
Lester S. Hecht
ATTORNEY.

3,105,230
Patented Sept. 24, 1963

3,105,230
COMPENSATING CIRCUITS

Robert M. MacIntyre, Gardena, Calif., assignor, by mesne assignments, to Thompson Ramo Wooldridge Inc., Cleveland, Ohio, a corporation of Ohio Filed Sept. 24, 1958, Ser. No. 763,040
14 Claims. (Cl. 340—347)

This invention relates to compensating circuits and, more particularly, to a system for automatically adjusting the operating characteristic of a circuit in order to obtain a desired performance. In further particular, the invention comprises a system associated with a circuit and which is capable of producing a compensation signal effective to cause changes in circuit operation whereby a desired output signal is produced in response to a known input signal.

Various compensation techniques have been employed in the prior art, especially in connection with D.C. amplifiers, which, as is known, are subject to drift effects and instability of gain. As an example, reference may be made to U.S. Patent No. 2,684,999 to Goldberg which shows a typical drift compensating circuit for a D.C. amplifier.

As is pointed out in my copending patent application, Serial No. 756,374, for "Drift Compensating Circuits," filed August 21, 1958, now Pat. No. 3,070,786, the Goldberg circuit does not compensate for overall drift where drift components are contributed by the D.C. amplifier as well as by the input signal source; the Goldberg circuit considers the input signal drift only.

While my copending application provides a very satisfactory solution for providing compensation for total drift in a D.C. amplifier, several further advantageous features characterize the present disclosure. The system of the copending application includes considerable A.C. amplification as well as synchronous rectification as part of a corrective feedback network. The system of the present invention accomplishes substantially equivalent drift compensation but eliminates the A.C. amplifier and the synchronous rectifier. Consequently, the present invention makes possible a considerable simplification in structure over the above-mentioned copending patent application.

In addition, it has been observed that prior art circuits require structure devoted solely to the function of drift compensation. It will be shown, however, that the arrangement of the present invention makes it possible to time-share the same compensating circuits between drift compensation and other purposes. Thus it will be shown that all of the important circuits of a combined digital-to-analogue and analogue-to-digital converter system may be regulated to respective desired operating conditions by utilizing a structure which is time-shared.

According to the basic concept of the present invention the circuit which is to have its operating condition controlled has its output signal coupled to a compensation signal generator which is sensitive to the polarity of its input signal. The compensation signal generator develops an output signal which changes in amplitude in one direction for a positive input signal and which changes in amplitude in the other direction for a negative input signal.

In one embodiment of the invention the compensation signal generator functions to develop a feedback control signal for a D.C. amplifier which adjusts the input signal level of the amplifier to compensate for the drift component appearing at the output of the amplifier. This type of compensation is also employed to control a variety of other circuits to adjust their operating characteristics to accomplish a desired relationship between an input signal and an output signal.

Specifically, the invention contemplates the use of a compensation signal generator embodying circuitry shown in my copending application entitled "Energy Transfer Circuits," Serial No. 755,024, filed August 14, 1958, now Pat. No. 3,014,169. This circuitry comprises a capacitor for energy storage which receives an input signal through first and second amplifiers which are effective to respectively charge and discharge the capacitor according to the polarity of the input signal. When a D.C. amplifier is to have its drift compensated for, the output signal of the D.C. amplifier is applied to the compensation signal generator at the same time a known input signal is applied to the D.C. amplifier. If the D.C. amplifier is to be stabilized at ground potential as a reference, the input of the D.C. amplifier is grounded at the time its output signal is applied to the compensation signal generator. The output signal of the compensation signal generator is then coupled through an adder circuit to the input of the D.C. amplifier. A feedback circuit is thus established, such that whenever a drift component appears which is positive (indicating a negative drift component at the input of the D.C. amplifier) a feedback signal is developed by the compensation signal generator which is effective to reduce the total drift to zero. That is, a signal other than zero volts appearing at the output circuit of the D.C. amplifier will cause a signal change in the compensation signal generator such that the input signal applied to the D.C. amplifier is altered in a manner to eliminate the output signal drift.

When the invention is employed as part of an analogue-to-digital or digital-to-analogue converter system, the compensation signal generator may be of the same type of circuit as is employed in developing the analogue output signal. In this case the circuits of the converter system may be time shared for drift compensation at various points. The input amplifier of the system may be compensated in the above-indicated manner. In addition, the decoder circuit of the converter, which may comprise a series of weighted current sources, may similarly be adjusted in performance. In this case the reference signal applied to the input amplifier of the converter would be selected to correspond to the desired signal weight of the decoder circuit to be adjusted. For instance, when the most significant decoder is to be adjusted the input signal must correspond to the current or voltage expected to be obtained. The difference between the amplifier input reference signal and the decoder output signal is then detected and applied to the compensation signal generator. The compensation signal generator produces an output signal which varies in amplitude according to the polarity of the difference between the reference input signal to the decoder and its output signal. This compensation signal is then applied to the decoder in a manner which causes a variation in its output signal to eliminate the error. A specific example of this technique will be presented in the detailed discussion which follows.

Many other compensating techniques are possible according to the basic concept of the invention, several of which are illustrated in detail below. Briefly, it may be stated that the invention is applicable to any situation where a signal level is to be adjusted, the gain or bias level of a circuit is to be controlled, or where the frequency of an oscillator is to be regulated.

Accordingly, it is an object of the present invention to provide improved means for compensating for undesired changes in the characteristics of a circuit.

A specific object of the invention is to provide means for compensating for the drift inherent in a D.C. amplifier.

Another object of the invention is to provide a simple and effective means for adjusting the operation of one or a plurality of circuits of a converter system.

Yet another object of the invention is to provide a device which may be employed to regulate or control the operation of a circuit to provide a desired input-output relation, with respect to signal amplitude, gain, bias level, or frequency.

Another specific object of the invention is to provide a system for establishing and maintaining a bias for an amplifier of a converter system, said bias, for example, corresponding to a particular value in the conversion.

Another specific object of the invention is to provide a compensating system for adjusting for errors in the reference signal applied to a decoder circuit.

Yet a further specific object of the invention is to provide a simple and effective arrangement for controlling the frequency at wihch an oscillator generates its output.

The novel features which are believed to be characteristic of the invention, both as to its organization and method of operation, together with further objects and advantages thereof, will be better understood from the following description considered in connection with the accompanying drawings. It is to be expressly undersood, however, that the drawings are for the purpose of illustration and description only, and are not intended as a definition of the limits of the invention.

Figure 7:
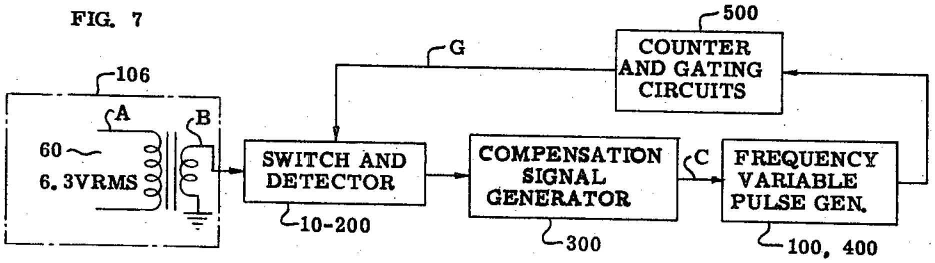
FIG. 7 is a combined schematic and block diagram illustrating the manner in which the frequency of a circuit may be adjusted according to the present invention.
Figure 7A:
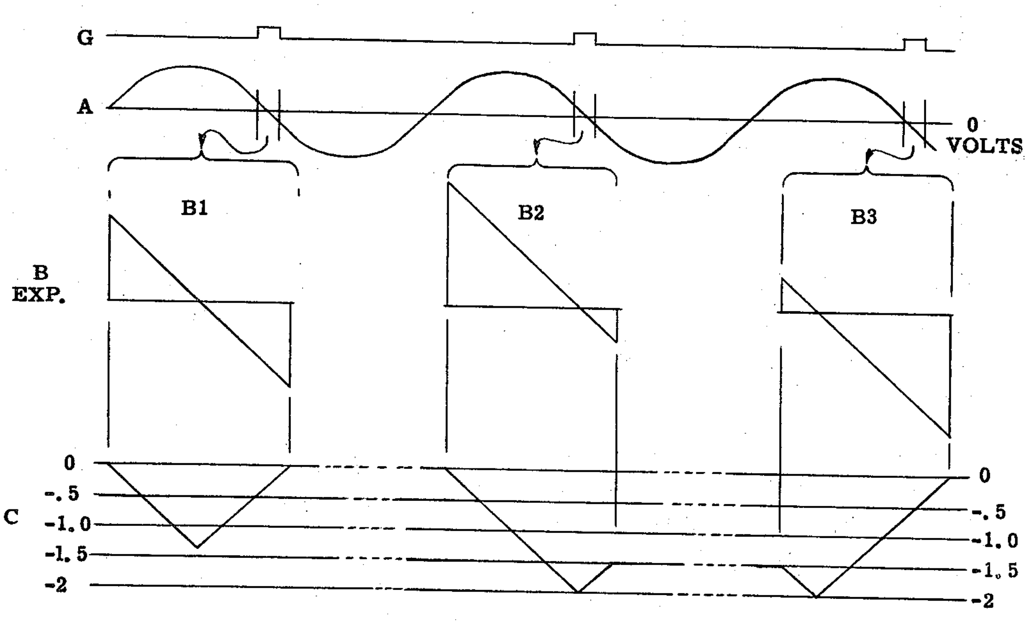
Figure 8:
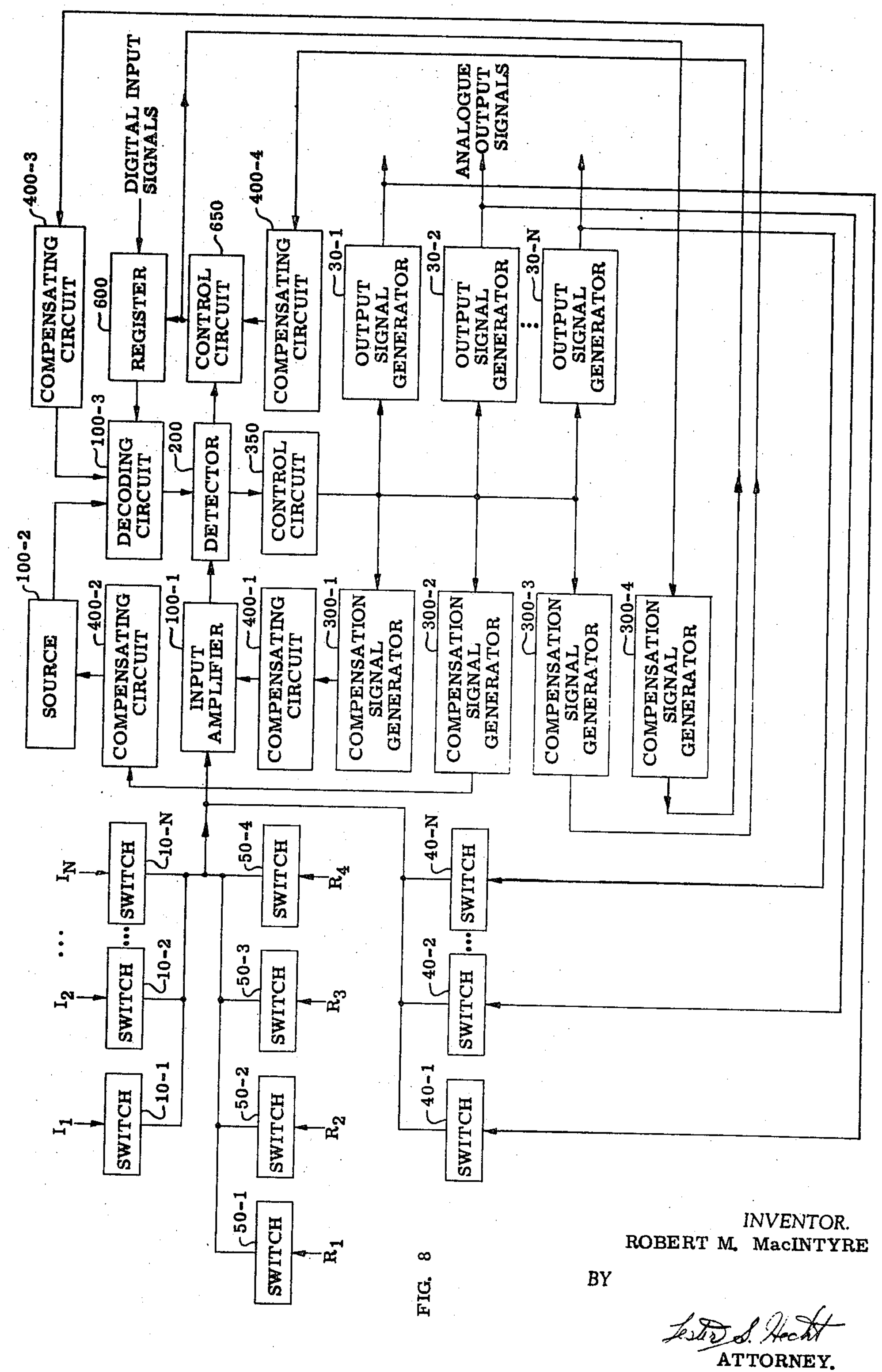

FIG. 7*a* is a composite set of waveforms illustrating the operation of the embodiment of FIG. 7;

FIG. 8 is a block diagram showing the application of the invention on a time-sharing basis to a converter system.

Figure 1:
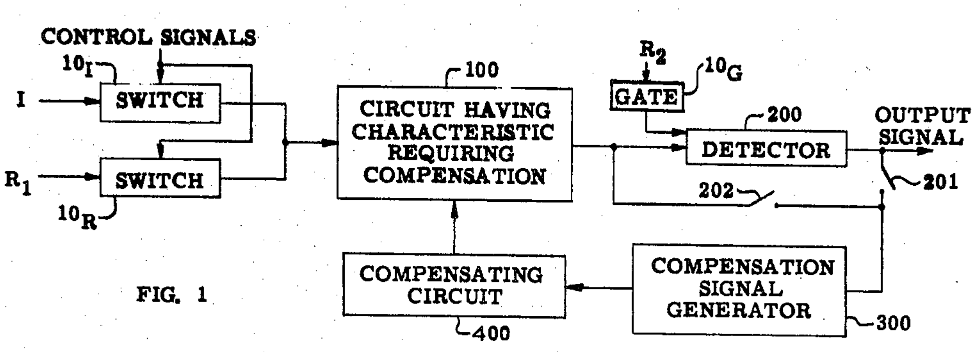
FIG. 1 is a generalized block diagram illustrating one embodiment of the invention.

Reference is now made to FIG. 1 wherein a circuit 100 is shown which has a characteristic requiring compensation. In the detailed description which follows this may be an amplifier, a decoder, a circuit having a bias to be set, or a pulse generator. Circuit 100 receives an input signal I through switch $\mathbf{10}_I$ or receives a reference signal $R_1$ through a switch $\mathbf{10}_R$. Switches $\mathbf{10}_I$ and $\mathbf{10}_R$ are alternatively operated by control signals which may be the outputs of a flip-flop, for instance. When signal $R_1$ is applied to switch $\mathbf{10}_R$ the output signal of circuit 100 is coupled to a detector 200 which simultaneously receives a second reference signal $R_2$ through a gate $\mathbf{10}_G$. The output signal of detector 200 passes through a switch 201 to compensation signal generator 300. Detector 200 may also be bypassed by the output signal of circuit 100 when a switch 202 is closed. Generator 300 is coupled to a compensating circuit 400, which in turn controls circuit 100 in the desired manner.

Figures 2, 3:
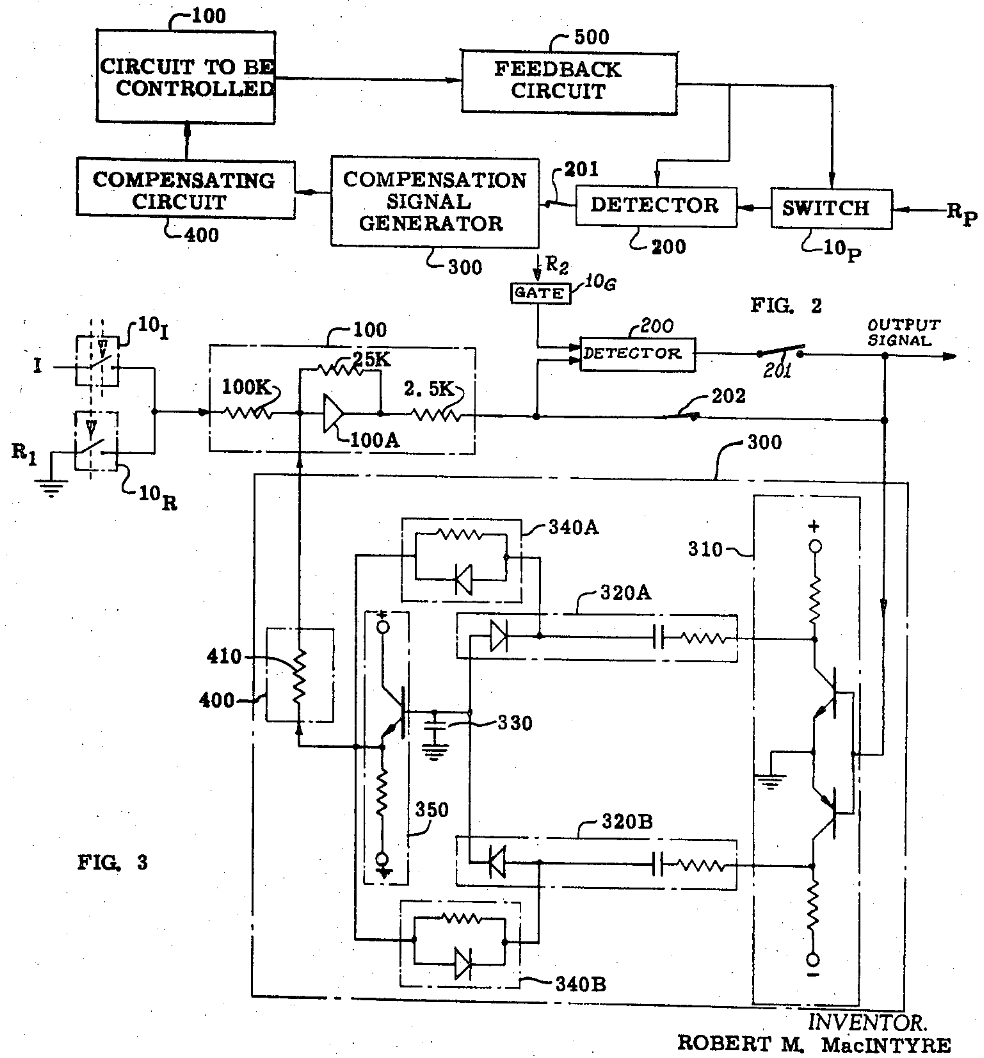
FIG. 2 is a block diagram of a circuit in which the invention is employed to control the frequency of an oscillator.
FIG. 3 is a schematic diagram illustrating a suitable form of the embodiment of FIG. 1.

A similar arrangement of the invention is shown in FIG. 2 where reference input signal $R_P$ is periodic and is applied through a switch $\mathbf{10}_P$ to detector 200. As before detector 200 is coupled to compensation signal generator 300 which controls circuit 100 through compensating circuit 400. The output signal of circuit 100 is applied through a feedback circuit 500 to control switch $\mathbf{10}_P$ and thus the application of signal $R_P$ to the detector 200. The specific operation of FIG. 2 will be considered in further detail below. The important thing to note with respect to FIGS. 1 and 2 is that in both cases control of circuit 100 is effected through compensation signal generator 300.

FIG. 3 is a schematic diagram of a circuit embodying the present invention. It is assumed here by way of example that circuit 100 is an operational amplifier having a drift component. It is desired that when the input of amplifier 100 is at zero volts (ground potential), the output be zero volts. Therefore, signal $R_1$ applied as one input to amplifier 100 through switch $\mathbf{10}_R$, which may be a relay contact, is ground potential. The output of amplifier 100 is applied through a detector-amplifier 200 which has a very high gain so that an essentially square output signal is produced by detector 200, the signal being positive when the input difference signal is negative and negative when the input difference signal is positive and zero when the input difference signal is zero.

Generator 300 includes an input amplifier 310 which is effective to develop a discharge control signal for a capacitor storage circuit 330 through a circuit 320A. A similar operation for developing a charging signal is developed through circuit 320B when the input signal received from circuit 200 is negative. The specific details of the various circuits in generator 300 will not be described herein since they are amply covered in my aforementioned application, Serial No. 755,024.

In operation, generator 300 develops a signal which alters the charge stored in capacitor 330. Whenever the output signal of amplifier 100 is positive, amplifier 310 in generator 300 causes capacitor 330 to discharge through circuit 320A, and whenever the output signal of amplifier 100 is negative amplifier 310 causes capacitor 330 to charge through circuit 320B. The inclusion of circuits 340A and 340B is to insure linear charging and discharging for any magnitude of charge already stored in capacitor 330, as fully discussed in the aforementioned copending patent application. The output signal developed by generator 300 is coupled through an output circuit 350 therein to compensating circuit 400 which here comprises a resistor 410. This is then connected to the input circuit of amplifier 100A in circuit 100 in a well known adder arrangement.

Suitable values of the resistors in the amplifier comprising circuit 100 are indicated so that a typical operation may be illustrated. The operating characteristic of amplifier 100, if perfect, would be such that when the input is grounded, the output is at zero volts. The gain of amplifier 100 is otherwise ¼. If the output drift is positive, detector amplifier 200 inverts this signal and circuit 310 in generator 300 charges capacitor 330. As a result, the input signal level applied to amplifier 100A in circuit 100 rises causing a drop, because of the inversion, in output signal of approximately ¼ of this charge. This continues until the drift component at the output of amplifier 100 is reduced approximately to zero. In effect, then, the signal applied to amplifier 100 has been adjusted so that with a zero input signal the output signal thereof is also zero. It is the characteristic of generator 300 that when it is cut off from any input signal, it will retain its output signal level for a long period of time. Thus this arrangement may be employed in a system such as a digital-to-analogue converter on a time-sharing basis where the compensation cycle is performed once each word time of computing, or even less frequently.

Figure 4:
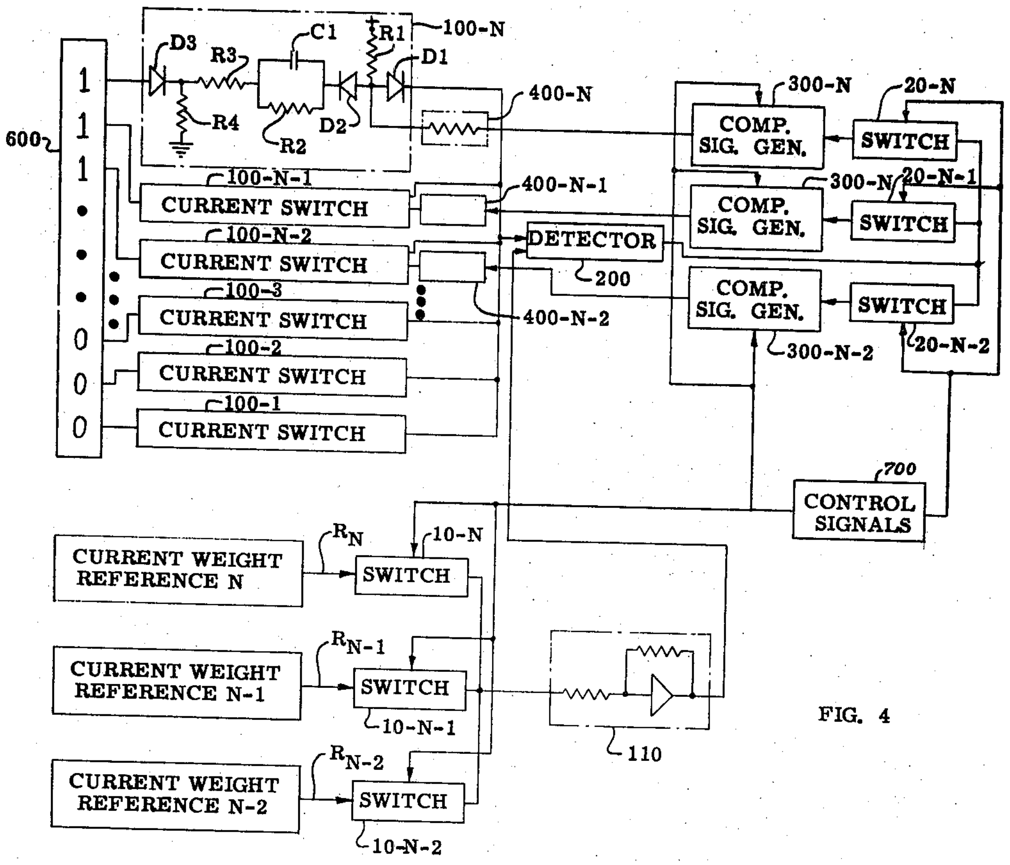
FIG. 4 is a combined schematic and block diagram illustrating the manner in which any of a plurality of decoder circuits may be adjusted according to the invention.

The invention is applicable as well to circuits where there is no gain and the purpose of the compensation is to adjust a current or voltage. A current adjustment is indicated in FIG. 4 as an illustration. In this arrangement circuit 100 comprises a series of current switches referenced as 100–N . . . 100–1, corresponding to the N digits of a binary number stored in a register 600. In the particular case illustrated, only the three most significant current switches, namely, 100–N; 100–N–1; and 100–N–2, are to be adjusted. Thus these circuits are coupled to associated compensating circuits 400–N; 400–N–1; and 400–N–2, respectively. Each compensating circuit 400 is coupled between a corresponding decoder circuit and a compensation signal generator, such as 300–N, 300–N–1, and 300–N–2. Circuits 300 receive input signals through associated switches 20–N, 20–N–1, and 20–N–2, each of which receives the output signal of a detector 200 coupled to the combined output signals of switches 100. Detector 200 also receives the output signal of an operational amplifier 110 which receives input reference signals $REF_N$, $REF_{N-1}$, and $REF_{N-2}$, corresponding to the desired current weights for decoding circuits 100–N, 100–N–1, and 100–N–2. These reference signals are applied through associated switches 10–N, 10–N–1, and 10–N–2.

To illustrate an operation, it will be assumed that only decoding circuit 100–N is turned on and that at this time, switch 10–N, in response to timing control signals 700, connects the current weight reference $REF_N$ to operational amplifier 110. The output of amplifier 110 is applied to detector 200. In this case, then, detector 200 produces a signal indicating the difference between the output current derived through circuit 100–N and the desired reference current. This difference signal is then applied through switch 20–N to compensation signal generator 300–N. If the current produced by circuit 100–N is too high with respect to its reference, compensation signal generator 300–N decreases the level of its output signal which, in turn, is effective through compensating circuit 400–N to decrease the output current of decoder circuit 100–N.

In a similar manner if the current output of circuit 100–N is too low, detector 200 produces a signal which causes compensation signal generator 300–N to increase its output signal level until the effective difference between the reference signal and the output of circuit 100–N is zero.

Figure 5:
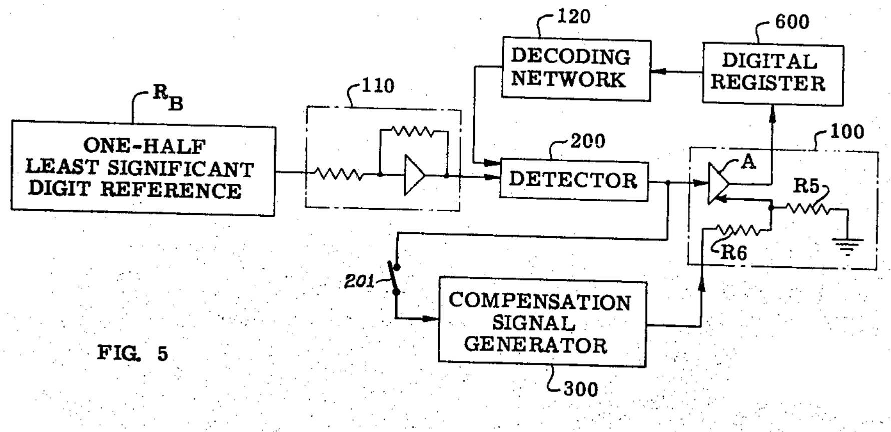
FIG. 5 is a combined schematic and block diagram illustrating the manner in which a control circuit may have its bias adjusted to a predetermined level.

Thus far the invention has been described in two basic applications. The first pertains to the compensation for the drift inherent in an amplifier, in particular, an operational amplifier. The second application shows the manner in which current may be regulated with particular reference being made to a digital decoding circuit. Reference is now made to FIG. 5 wherein the invention is employed to regulate the bias levels of a circuit. In this case circuit 100 includes an amplifier A having a bias level which is adjusted to a network illustrated as including resistors R5 and R6. The operation of the resistor network in circuit 100 is to bias amplifier A therein so that digital register 600 does not receive an input control signal until the output signal of detector amplifier 200 reaches a predetermined level. In this example, detector amplifier 200 is an adder circuit comprising an operational amplifier 714 responsive to the sum of the input signals applied through resistors 710 and 712 to produce the output signal. For the purpose of the present discussion, it will be assumed that it is desired to establish the bias level of circuit 100 such that no control signals are applied to register 600 unless the difference signal derived through detector 200 is greater than one-half of the least significant digit value of register 600. These values are derived through decoding circuit 120 which is coupled to detector 200, so that nothing happens in register 600 unless the difference between the input signal applied to amplifier 110 and the analogue equivalent of digital register 600, as derived through decoding network 120, is greater than one-half of the least significant digit value.

When the reference signal from generator $R_B$ is applied to amplifier 110 register 600 is set to a zero representing state. Thus, without the operation of the invention, a signal would normally be applied to register 600 causing it to change state in a manner which is now well known in the converter art. However, switch 201 closes connecting the output signal of detector 200 to the input of compensation signal generator 300 which changes the bias level of circuit 100 until its output signal is substantially zero. Thus switch 201 is closed, allowing the circuit 100 to be adjusted, and then opened so that with an input signal corresponding to one-half of at least significant digit value, amplifier 100 will have a zero output signal.

Figure 6:
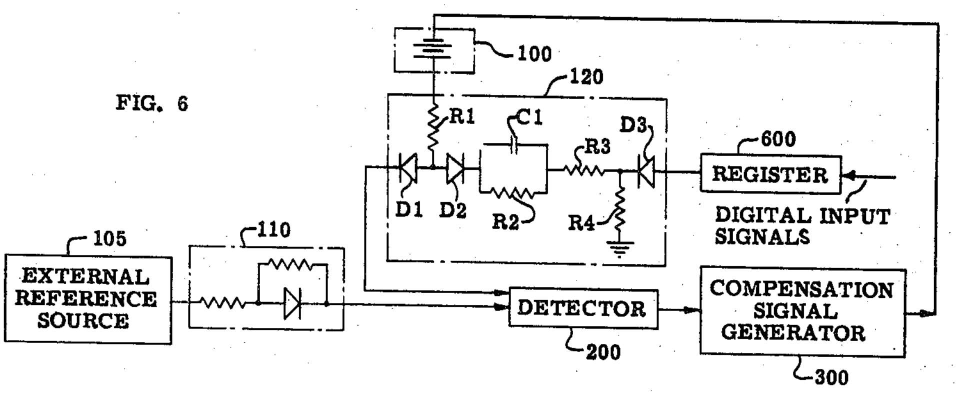
FIG. 6 is a combined schematic and block diagram illustrating the manner in which a reference voltage may be adjusted according to the invention.

The embodiment of the invention in FIG. 6 illustrates the manner in which the voltage reference level of the internal reference source 100 is adjusted. In this case, it may be assumed that the decoder 120, has already been adjusted to provide the desired current output. Thus, circuit 120 in FIG. 6 may be similar to circuit 100–N shown in FIG. 4. In operation, then, the embodiment of FIG. 6 detects a difference between potential resulting from source 100 through circuit 120 as applied to detector 200 and the potential at the output of operational amplifier 110 (which may also be assumed to have been previously calibrated or adjusted) in response to an external reference source 105. Detector 200 then actuates generator 300 to vary the reference level of internal reference source 190 until the output of circuit 120 is substantially equal to the potential at the output of amplifier 110 due to the external reference source.

Another interesting variation in the application of the present invention is illustrated in FIGS. 7 and 7*a*. In FIG. 7, a variable frequency pulse generator 100 is to be controlled to a desired pulse rate or frequency. This is accomplished by employing an external periodic reference source 106 which is shown with a typical input reference signal, such as 60 cycle 6.3 volt R.M.S. signal. The output signal B of source 106 is applied to a switch in detector circuit 10–200 which is controlled by a gating signal G derived through a counter and gating circuit 500. Counter and gating circuits 500 are actuated to produce a gating signal G after a predetermined number of pulses are generated by generator 100. It will be noted that a compensating circuit 400 is assumed to be included within the pulse generator circuit 100 and is arranged to vary the frequency of the pulse generator in accordance with the level of the signal applied from compensation signal generator 300.

The operation of the circuit may be best described with reference to the waveforms of FIG. 7*a*. Here it will be noted that gating signal G occurs within the range of the time that input signal A crosses over some reference signal values, such as zero volts. This crossover point is shown expanded in waveform B where a portion B1 indicates the situation where the crossover of waveform A occurs precisely during the middle of the gated period controlled by signal G. As another illustration of a typical operation, it is assumed that during the waveform portion B2, the gating signal G occurs relatively early with respect to the crossover time of waveform A and the expanded section therefore shows a longer period of time when the amplitude of waveform A exceeds the zero volt reference. In the third case, during the period of waveform B3, the gate period occurs late with respect to the crossover time of waveform A and therefore the major portion of waveform A occurs below the zero volt reference line.

The gating operation is assumed to be controlled through switch and detector circuit 10–200 which may be conventional and therefore is not described. Its essential operation is simply to produce an output signal corresponding to signal B during the time gating signal G is present. It may be assumed that during other times the output level of circuit 10–200 is substantially at zero the output signal C of compensation signal generator changes from a first level, such as zero volts, to decrease following the decreasing portion of waveform $B_1$ and in a similar manner and at the same rate of change increases during the time that waveform $B_1$, is negative. Thus, the net changes of signal C over this interval is zero, which means that the frequency of pulse generator 100 has not changed. Thus the waveform section $B_1$ represents a condition where the frequency of operation of circuit 100 is synchronized with that of reference 106.

In the case illustrated by waveform section $B_2$, signal C is decreased for a longer period of time than it is increased. Thus, whereas as an illustration it may be assumed to start at zero volts, the decreasing variant may take the output signal to perhaps −2 volts, leaving a time remaining sufficient only to restore the value to −1.5 volts. This then illustrates the case where the frequency of the pulse generator 100 must be decreased since gating signal G occurred too early in time. A decrease in frequency is effected by circuit 400 included within the pulse generator which, it will be recalled, is assumed to be voltage responsive to vary the frequency directly as the voltage applied thereto.

In the last case illustrated where waveform $B_3$ has a longer negative portion, it is assumed, as an illustration, that the signal C starts with a valve of −1.5. In this case, however, signal C assumes the value of approximately zero volts at the end of the interval which is an increase from the initial state of −1.5 volts and thus is effective to increase the frequency rate by a proportional amount. Thus any changes in frequency in circuit 100 are compensated for by a change in the voltage level of signal C at the end of the period of control which will result in a change of the frequency to compensate for the drift therein with respect to reference source 106.

While in many cases the invention may be employed advantageously for individual circuits, it may also be employed on a time-sharing basis in a system such as is illustrated in FIG. 8. This system is arranged to perform digital-to-analogue conversions or analogue-to-digital conversions through the same circuits. In the case of digital-to-analogue conversions, digital input signals are applied to register 600 which has its digits converted into an equivalent analogue signal through decoding circuit 100–3. Decoding circuit 100–3 controls detector 200 which also receives the signals from input amplifier 100–1. The output signal from detector 200 is applied to control circuit 350 which is effective to select one of a plurality of output signal generators 30–1, 30–2, . . . and 30–N, in the case where an analogue output signal is to be generated or select one of compensation signal generators 30–1 . . . 30–4 in the case where an adjustment in one of four circuits is to be made. When analogue output conversion is performed a corresponding output signal generator is caused to increase or decrease its signal value until it corresponds to the analogue equivalent of the digital number entered initially into register 600. During this time, signals from one of the output signal generators 30 are applied through respective switches 40–1, 40–2, . . . 40–N to the input circuit of amplifier 100–1. Detector 200 then produces a signal which indicates the difference between the analogue equivalent of the digital number in register 600 and the analog output signal of the corresponding output signal generator 30 and any difference signal is then effective to change the level of the analog output signal until it is equal to the analogue equivalent of the digital number contained in circuit 600.

During analogue-to-digital conversion operation any one of a plurality of analog input signals $I_1$, $I_2$ . . . $I_N$, may be selectively applied to input amplifier 100–1 through an associated input switch 10–1, 10–2, . . . and 10–N. In addition, switches 50–1, 50–2, 50–3, and 50–4, are provided to permit the selective application of reference signals $R_1$, $R_2$, $R_3$, and $R_4$, respectively, to amplifier 100–1. In an analogue-to-digital conversion operation, the analog input signal I is applied to amplifier 100–1, during the time that register 600 is changed in state under control of circuit 650, which receives an output signal from detector 200 indicating the difference between the analog input signal level and the analogue equivalent of the digital member contained in register 600. Control circuit 650 is biased through a compensating circuit 400–4, so that no change is made in the contents of register 600 until the difference between the analog input signal applied to amplifier 100–1 and the analogue equivalent of the digital setting of register 600 is greater than the least significant digit value, in analogue terms of the register 600.

It will be noted that compensation signal generators 300–1, . . . 300–4 are provided for each of the compensating operations to be performed, being associated with compensating circuits having corresponding reference numbers. Thus, circuit 300–1 controls compensating circuit 400–1 to adjust input amplifier 100–1, at the time reference signal $R_1$ is applied through switch 50–1 thereto. This operation has been discussed above with reference to FIG. 3. In a similar manner, compensation signal generator 300–2 is controlled through compensating circuit 400–2 to adjust the value of source 100–2 at the time reference signal $R_2$ is applied by switch 50–2 to amplifier 100–1. This type of compensation has been discussed above with reference to FIG. 6. Compensation signal generator 300–3 is effective through compensating circuit 400–3 to adjust the operating conditions of decoding circuit 100–3 at which time reference signal $R_3$ is applied through switch 50–3 to amplifier 100–1. In this case, anyone of a plurality of weighting circuits within decoding circuit 100–3 may be adjusted at the same time as previously described with respect to FIG. 4. It may be assumed then therefore that $R_3$ includes as many different reference signals applied to as many associated switches as there are weighting circuits to be adjusted in circuit 100–3.

In a similar manner it can also be assumed that when source 100–2 is to be adjusted many possible operations are possible where, for example, decoding circuit 100–3 is actuated so that all of the weighting circuits are operative at the time, or it may be adjusted by using only a single decoding circuit.

The final example illustrated is that of the adjustment of a bias control circuit 650 through compensating circuit 400–4 in which case the output signal of control circuit 650 is applied to compensating signal generator 300–4. This operation is similar to that discussed above with reference to FIG. 5.

From the foregoing description it should now be apparent that the invention provides an effective means for compensating the changes in the characteristics of various types of circuits. It has been shown in the few examples herein that the invention is adapted for adjusting voltage and current values, the gain or drift inherent in an amplifier, the bias level of a circuit, and the frequency of a circuit.

It has also been shown that the invention is readily incorporated into a complex system, such as an analogue-to-digital converter on a time-sharing basis, where circuits similar to those already required for the system are employed.

In addition, the invention has been illustrated showing the use of a specific type of compensation signal generator such as that described more fully in my copending application Serial No. 756,374. In this case, a storage capacitor is charged or discharged in accordance with the error or drift component to be compensated for and is then effective to change the operating condition or characteristic of the circuit until this is zero for an applied reference signal.

It will be understood, however, that the presence of a few examples herein illustrating the manner of use of the invention is not to be construed to limit the invention in any manner, since the application of the invention is virtually unlimited. Furthermore, it is not essential to the invention that any particular type of compensation signal generator be employed. It may be possible, for example, to generate an increasing or decreasing compensation signal through the use of magnetic cores, through ferroelectric materials, or various other types of materials which have a storage characteristic of some type.

Accordingly, it will be recognized by those skilled in the art that the invention is of very broad scope, being limited only by the definition in the appended claims.

I claim:

1. A device for compensating for the drift inherent in an operational amplifier, said device comprising:
input means for selectively applying an input signal or a first reference signal to said amplifier;
a difference sensing circuit for receiving the output signal of said amplifier and a second reference signal representing a driftless output signal expected from said amplifier, said sensing circuit producing an error output signal representing the magnitude and polarity of drift in the output signal of said amplifier;
an energy storage circuit;
means applying said error output signal produced by said sensing circuit to said energy storage circuit;
said energy storage circuit including a storage element and first and second switching means;
said first and second switching means each being respectively actuatable to pass current in response to error output signals representative of different polarities of drift in the output signal of said amplifier;
coupling means connecting said first and second switching means to said storage element to cause currents passed by said first and second switching means to respectively charge and discharge said storage element by an amount determined by the magnitude represented by said error output signal; and
impedance means coupling said storage element to the input circuit of said amplifier for causing the output signal of said amplifier to become substantially equal to said second reference signal when said first reference signal is applied to said amplifier.

2. In combination: switching means for selectively applying an input signal and a first reference signal to a circuit; a compensation device coupled to said circuit for varying the characteristic of said circuit to compensate for deviations between the output signal of said circuit and the expected output signal corresponding to said first reference signal; second means for receiving the output signal of said circuit and a second reference signal corresponding to the expected output signal for said circuit when said first reference signal is applied through said switching means, said second means producing a deviation signal representing the drift between the actual output signal and the expected output signal; and third means for receiving said deviation signal and for controlling said compensation device to vary said characteristic until said output signal is substantially equal to said expected output signal.

3. An arrangement for adjusting the operating point of a circuit to compensate for drift comprising:
first means for selectively applying a reference signal to said circuit;
sensing means for producing an error signal representing the magnitude and polarity of drift in the output signal of said circuit;
an energy storage circuit;
means applying said error signal produced by said sensing circuit to said energy storage circuit;
said energy storage circuit including a storage element and first and second switching means;
said first and second switching means each being respectively actuatable to pass current in response to error signals representative of different polarities of drift in said output signal;
coupling means connecting said first and second switching means to said storage element to cause currents passed by said first and second switching means to respectively charge and discharge said storage element by an amount determined by the magnitude represented by said error signal; and
impedance means coupling said storage element to said circuit for causing the output signal of said circuit to become substantially equal to said reference signal.

4. A conversion system which is capable of both digital to analog and analog to digital conversion comprising: a register, decoding means connected to said register, a detector connected to said decoding means, an input amplifier also connected to said detector, means for selectively applying signals to said input amplifier, a first control circuit connected to said detector, a plurality of output signal generators connected to said first control circuit, a plurality of compensation signal generators connected to said first control circuit, switching means connecting the output of said output signal generators to said input amplifier, a second control circuit connected to said register, said detector also being connected to said second control circuit, a source connected to said decoding circuit, compensating circuits connected to each of said compensation signal generators, one of said compensating circuits connected to said second control circuit to provide a bias to said second control circuit, one of said compensating circuits connected to said decoding circuit for adjusting the operating condition of said decoding circuit, one of said compensating circuits connected to said source to adjust the value of said source, and one of said compensation circuits connected to said input amplifier to adjust said input amplifier for drift.

5. A system for synchronizing the cycle time of operation of a circuit with a reference signal comprising: first means for selectively applying a control signal to said circuit; a detector included within said first means actuable to produce an output signal representing the difference between the phase of said reference signal and that of said circuit; a compensation signal generator included within said first means for translating said output signal into the control signal having an amplitude which varies according to said phase difference; and a feedback device for applying the output signal of said circuit to said first means.

6. A system for compensating for the error component in the output signal of a current weighting circuit, said system comprising: first means for supplying a current weight reference signal; second means for detecting the difference between said current weight reference signal and the output signal of said current weighting circuit; third means coupled to said second means for producing a correction signal which varies in amplitude according to the polarity of the difference detected by said second means; and fourth means for adjusting the current output of said current weighting circuit in response to said correction signal to eliminate substantially all of said error component.

7. In a system wherein a plurality of current weighting circuits are controlled by a digital register to produce respective signals representing the significance of the digit signal applied thereto, an arrangement for varying the operating conditions of certain of the most significant current weighting circuits in said system to eliminate most of the drift errors inherent therein, said arrangement comprising: a plurality of signal storage circuits corresponding to the current weighting circuits whose errors are to be substantially eliminated; an error sensing circuit for receiving a plurality of reference signals representing the desired current weight of the respective current weighting circuits to be controlled and the respective output signal of the associated current weighting circuit and for producing a corresponding plurality of signals indicating the deviation of each current weighting circuit from the expected output signal; and means for translating each error signal into a correction signal for the respective current weighting circuit to reduce or eliminate said drift errors.

8. In a digital system wherein the setting of a digital register is controlled through a control circuit having a predetermined bias input level which must be exceeded by an input signal before the control circuit is actuated, a device for adjusting the bias level of said control circuit to compensate for changes in the operating condition of said control circuit, said device comprising: first means for producing a reference signal corresponding to the desired bias level for said control circuit; second means for comparing said reference signal to the analogue equivalent of the zero setting of said digital register; third means associated with said second means for producing a correction signal corresponding to the difference between said reference signal and said analogue equivalent; and fourth means responsive to said correction signal for varying the bias level for said control circuit until said correction signal is substantially zero.

9. A device for compensating for the drift inherent in an internal source comprising: an external reference source; means for detecting the difference between the external reference source and said internal source and for producing a difference signal indicating the polarity of the difference; and means responsive to said difference signal for producing a correction signal for application to said source to correct for the drift therein, said correction signal being varied in amplitude in a direction corresponding to the polarity of said difference signal.

10. A device for controlling the frequency of a pulse generator comprising: first means for counting the output pulses of said generator and producing a gating signal having a frequency corresponding to the frequency of said pulse generator; second means for supplying a periodic reference signal having a frequency corresponding to the desired frequency for said pulse generator; third means for producing a signal which decreases in value during each gating signal when the amplitude of said periodic reference signal is above a fixed reference signal level and which increases in value during each gating signal when the amplitude of said periodic reference signal is below said fixed reference level; and fourth means coupled to said third means and to said pulse generator for varying the frequency of said pulse generator until the time durations of increasing and decreasing value in the signal of said third means are substantially equal.

11. In a digital-to-analogue converter system wherein an output signal is developed by changing the analogue level of an output signal, produced by one of a plurality of output signal generators, until it corresponds to the analogue equivalent of a digital number in a register, the system including a D.C. amplifier for receiving the analogue output signals produced by said generators, a device for compensating for the drift in said D.C. amplifier, said device comprising: first means for applying a reference signal to said D.C. amplifier; second means for setting said register to a digital value corresponding to said reference signal; third means for producing a difference signal representing the comparison between the analogue equivalent of the setting of said register and the output signal of said D.C. amplifier; and fourth means for applying said difference signal to one of said output signal generators to produce a correction signal to eliminate any output drift component produced by said D.C. amplifier.

12. In a converter system wherein an output signal is developed by changing the analogue level of the output signal, produced by one of a plurality of output signal generators, until it corresponds to the analogue equivalent of a digital number in a register, the system including first means for producing a difference signal indicating the difference between said analogue equivalent and an applied input signal, second means for producing current weight signals representing respective digital places in said register, and third means controlling the setting of said register according to the difference between said analogue equivalent and the output equivalent of the input signal applied to said first means, an arrangement for compensating for error components in various of the means employed in said converter, said arrangement comprising: a plurality of input switches for applying reference input signals to said first means; fourth means for setting said register to digital values representing the analogue equivalent of the output signal desired for the particular reference signal applied; fifth means for applying said difference signal to a respective one of said plurality of output signal generators, each generator being adapted to produce a correction signal for a respective circuit having an error output component; and sixth means for applying the correction signal of each output signal generator receiving said difference signal through said fifth means to a respective circuit requiring compensation to correct for its error component.

13. The arrangement defined in claim 12 wherein said second means comprises current weighting circuits and has at least one of its current weighting circuits coupled to said first means, said register being set to represent the digital weight of the current weighter to have its error component corrected, and said input reference signal being selected to correspond to an error-free current weight.

14. The arrangement defined in claim 12 wherein said third means includes a bias circuit for determining the level of sensitivity of said register, said level of sensitivity being adjusted to correspond to one half of the least significant digit value for said register by applying an input signal of corresponding weight to said first means and setting said register to zero, while coupling one of said output generators to said first means through said fifth means.

References Cited in the file of this patent

UNITED STATES PATENTS

| | | |
|---|---|---|
| 2,685,000 | Vance | July 27, 1954 |
| 2,714,136 | Greenwood | July 26, 1955 |
| 2,730,573 | Sedgfield et al. | Jan. 10, 1956 |
| 2,734,949 | Berry | Feb. 14, 1956 |
| 2,736,889 | Kaiser et al. | Feb. 28, 1956 |
| 2,741,668 | Iffland | Apr. 10, 1956 |
| 2,784,396 | Kaiser et al. | Mar. 5, 1957 |
| 2,828,482 | Schumann | Mar. 25, 1958 |
| 2,839,740 | Haanstra | June 17, 1958 |
| 2,970,266 | Molloy et al. | Jan. 31, 1961 |